United States Patent [19]

Harris

[11] Patent Number: 5,601,256
[45] Date of Patent: Feb. 11, 1997

[54] AIRCRAFT STABILIZING SYSTEM

[76] Inventor: Leonard Harris, 730 Normandy P., Delray Beach, Fla. 33484

[21] Appl. No.: 387,585

[22] Filed: Feb. 13, 1995

[51] Int. Cl.⁶ .................................................. B64B 1/36
[52] U.S. Cl. ........................................ 244/52; 244/76 R
[58] Field of Search .............................. 244/3.21, 3.22, 244/52, 76 R

[56] References Cited

U.S. PATENT DOCUMENTS 2,395,435  2/1946  Thompson et al. ................... 244/52
3,008,672  11/1961 Moore et al. ........................ 244/52
3,210,937  10/1965 Perry ................................... 244/52
4,648,569  3/1987  Stewart ............................ 244/76 R Primary Examiner—Andres Kashnikow
Assistant Examiner—Tien Dinh
Attorney, Agent, or Firm—Robert M. Downey, P.A.

[57] ABSTRACT

A system for stabilizing an aircraft includes sensors positioned and disposed at predetermined locations on the aircraft and structured for sensing external forces acting on the aircraft at the sensor locations as a result of rapid changes in atmospheric conditions such as those associated with air turbulence and wind shear. A computer processor receives data from the sensors and activates one or more thrust generators positioned at predetermined locations of the aircraft to counteract the external forces and maintain the desired attitude and stability of the aircraft.

4 Claims, 1 Drawing Sheet

U.S. Patent  Feb. 11, 1997  5,601,256
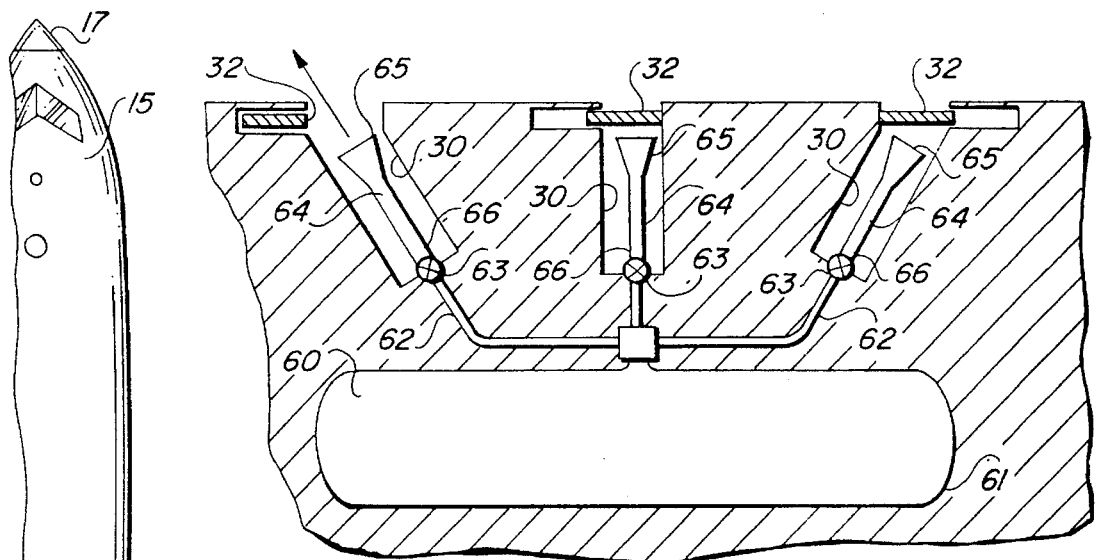
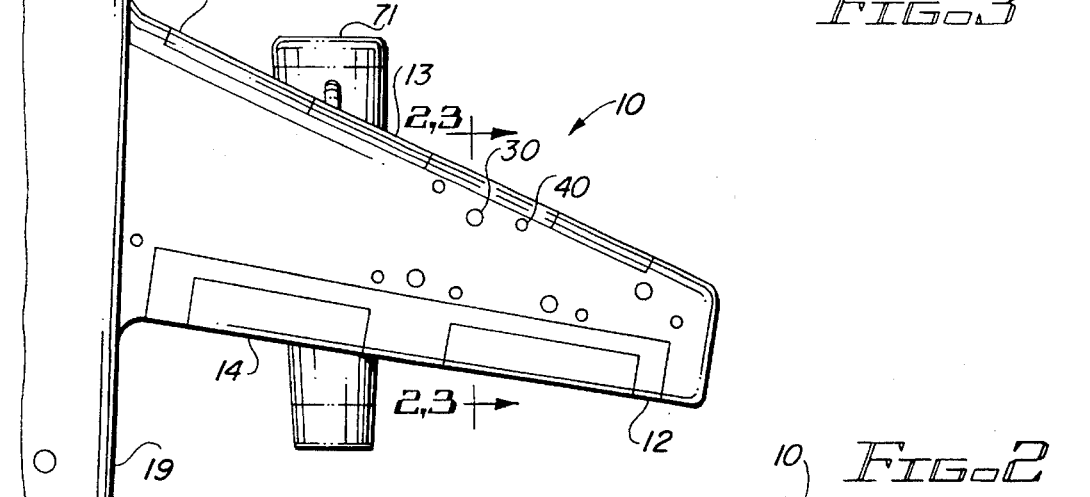
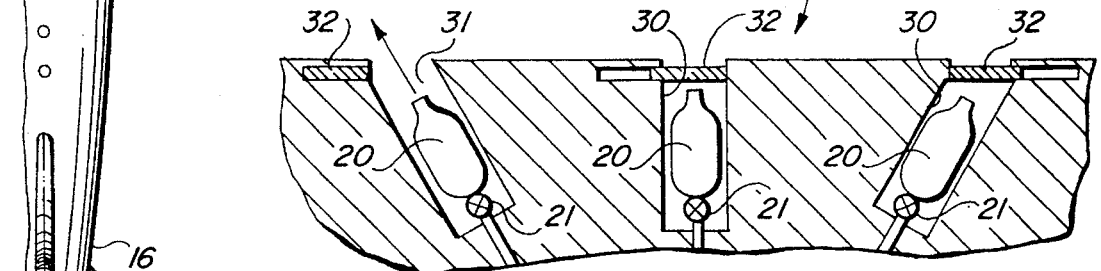
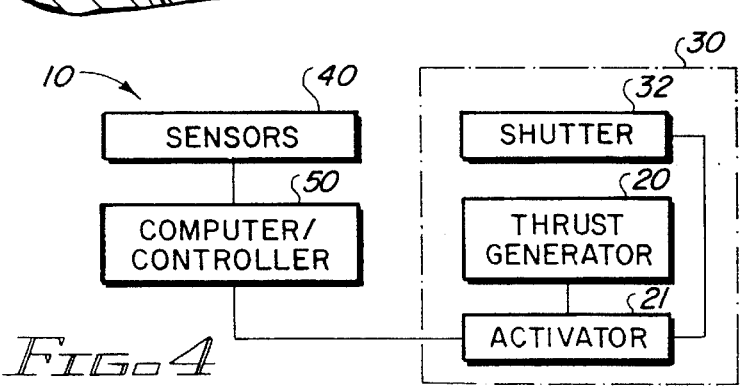

AIRCRAFT STABILIZING SYSTEM

FIELD OF THE INVENTION

The present invention relates to an aircraft stabilizing system and more particularly, to an aircraft stabilizing system for counteracting the effects of air turbulence and wind shear.

DESCRIPTION OF THE RELATED ART

The dangers associated with wind shear on aircraft are well known. In recent years, many aircraft have crashed due to wind shear during takeoffs and landings resulting in the loss of many lives.

Another dangerous condition associated with air travel is air turbulence. Aircraft are often effected by air turbulence during flight creating a potentially dangerous condition for the aircraft, as well as extreme discomfort for its passengers.

Attempts have been made to provide systems on aircraft to alleviate the effects of wind shear and air turbulence. But as evidenced by recent accidents of commercial aircraft due to wind shear, the potentially catastrophic effects still remain. An example of one such system is shown in U.S. Pat. No. 3,430,895. This system utilizes rate sensors to monitor the aircraft's angular rate of pitch, roll and yaw and fluid elements to convert the rate into a fluid signal to control reactor jets.

Other systems have focused on improving the directional control of the aircraft, but are not responsive to wind shear or air turbulence conditions. An example of one such system is shown in U.S. Pat. No. 5,273,237. This system utilizes pressurized air or fluid to provide a thrust to improve the directional control of the aircraft. However, this system is manually operated by the pilot and provides no means for detecting wind shear and air turbulence.

The present invention is designed to stabilize an aircraft in a manner not previously known by providing a computer controlled system capable of detecting external forces acting on the aircraft as a result of sudden changes in atmospheric pressure such as those associated with air turbulence and wind shear, and instantaneously reacting with a propulsive thrust sufficient to counteract the external forces and maintain the stability of the aircraft. The thrust may be generated by propulsive rockets, the release of compressed gas or exhaust provided by the aircraft engines.

SUMMARY OF THE INVENTION

The present invention relates to an aircraft stabilizing system for counteracting the effects of external forces acting on an aircraft such as air turbulence and wind shear. The system includes a plurality of propulsive rockets structured to generate a propulsive thrust sufficient to oppose external forces acting on the aircraft and maintain the stability of the aircraft. The rockets are stored within ports positioned on the wings and/or fuselage of the aircraft. The ports are disposed at distinct angles relative to the aircraft, thereby providing the capability to generate a propulsive thrust in different directions. A plurality of sensors are mounted on the wings and fuselage of the aircraft to detect and measure external forces acting on the aircraft as a result of sudden changes in atmospheric pressure such as those associated with air turbulence and wind shear. The system is computer controlled so that upon detection of a sudden change in atmospheric pressure, a rocket within a port oriented in the direction to counteract the external force causing the change in pressure, is fired, thereby generating a propulsive thrust sufficient to oppose the external force and stabilize the aircraft. The entire sensing and firing sequence takes place within a fraction of a second. Alternatively, the propulsive thrust may be generated by the release of compressed gas or by exhaust emitted by the aircraft engines.

With the foregoing in mind, it is an object of the present invention to provide an aircraft stabilizing system for counteracting the effects of external forces acting on an aircraft such as air turbulence and wind shear.

It is another object of the present invention to provide an aircraft stabilizing system with means for sensing sudden changes in atmospheric pressure such as those associated with air turbulence and wind shear.

It is yet another object of the present invention to provide an aircraft stabilizing system which generates a propulsive thrust for counteracting the external forces and maintaining the stability of the aircraft.

It is a further object of the present invention to provide an aircraft stabilizing system which is computer controlled to monitor external conditions and activate the propulsive thrust upon detection of sudden changes in atmospheric pressure such as those associated with air turbulence and wind shear.

These and other objects and advantages of the present invention will become more readily apparent in the description which follows.

BRIEF DESCRIPTION OF THE DRAWINGS

For a fuller understanding of the nature of the present invention, reference should be had to the following detailed description taken in connection with, the accompanying drawings in which:

FIG. 1 is a top plan view of the right side of the aircraft showing the location of the ports and sensors.

FIG. 2 is a cross sectional view taken along the line 2—2 of FIG. 1 showing the angular orientation of the ports and the propulsive rockets.

FIG. 3 is a cross sectional view taken along the line 3—3 of FIG. 1 showing the compressed gas thrust means embodiment.

FIG. 4 is a functional block diagram of the aircraft stabilizing system.

Like reference numerals refer to like parts throughout the several views of the drawings.

DETAILED DESCRIPTION OF THE PREFERRED EMBODIMENT

With reference to FIGS. 1–4, the present invention is directed to an aircraft stabilizing system, generally indicated as 10, including a plurality of propulsive rockets 20, a plurality of ports 30, a plurality of sensors 40, and a computer monitoring and control system 50. Each rocket 20 is structured and disposed to provide a propulsive thrust in an outward direction relative to the aircraft and of a magnitude sufficient to counteract the effects of external forces acting on the aircraft, such as air turbulence and wind shear, thereby maintaining the desired attitude and stability of the aircraft. Each rocket 20 includes an activator 21 to ignite and fire the rocket 20.

Each port 30 is structured to hold one of the rockets 20 therein. The ports 30 are positioned at predetermined locations on the top 11, bottom leading edge 13 and trailing edge 12 of each wing 14. Ports 30 may also be positioned on the upper 15, lower 16, fore 17 and aft 18 sections of the aircraft fuselage 19. Thus, a counteracting thrust force from the rockets 20 can be directed upwardly, downwardly, in the forward direction or rearwardly relative to the aircraft as needed in order to maintain stability. Each port 30 includes an opening 31 at the external surface of the wing 14 or fuselage 19 in which it is located and a movable shutter 32 which is sized and configured structured to close the opening 31, thereby concealing the rockets 20 therein. The shutter 32 is structured to slide, within the aircraft, parallel to the external surface of the wing 14 or fuselage 19 in which it is located when moving between an open and closed position, thereby avoiding any adverse effects to the aircraft aerodynamics. The ports 30 are each oriented at select angles relative to the aircraft 19 so that the effects of an external force acting on the aircraft from any direction can be mitigated by firing those rockets 20 which are in ports 30 angled in a direction to oppose the external force.

The sensors 40 are mounted at predetermined locations on the top 11, bottom and leading edge 13 and trailing edge of each wing 14, as well as on the upper 15, lower 16, fore 17 and aft 18 of the fuselage 19. The sensors 40 are structured to detect and measure sudden changes in atmospheric pressure caused by external forces acting on the aircraft such as those associated with air turbulence and wind shear.

The computer monitoring and control system 50 is operably interconnected to the sensors 40, the shutters 32 and the activators 21 to monitor the sensor 40 measurements and control the opening and closing of the shutters 32 and the firing of the rockets 20. Upon detection of an external force on the aircraft by one or more of the sensors 40, the computer 50 determines the direction and force required to counteract the external force, slides the shutter 32 on one or more ports 30 which are oriented in the direction to oppose the external force to the open position, and initiates the activators 21, which in turn ignites the rockets 20 within the open ports 30, causing them to fire and generate the propulsive thrust necessary to counteract the external force. The entire sensing and firing sequence takes place within a fraction of a second.

With reference to FIG. 3, in a second preferred embodiment, the propulsive thrust is provided by compressed gas 60 in place of propulsive rockets 20. The compressed gas 60 is held under substantial pressure in a tank 61. A tank 61 is located in each wing 14 and in the fuselage 19 for operation with the ports 30 in the associated wings 14 or fuselage 19. Alternatively, one tank 61 may be centrally located on the aircraft for operation with all ports 30. A plurality of hoses 62 operably interconnects each tank 61 with its associated ports 30. Each hose 62 carries the gas 60 from a tank 61 to one of its associated ports 30. A normally closed activation valve 63 is mounted within each port 30 and connected to the end of the hose 62. The valve 63 is operably interconnected to the computer 50 and is structured to control the flow of gas in accordance with computer 50 commands. A nozzle 64, having a first open end 65 and a second open end 66 is mounted within each port 30 and positioned so that the nozzle 64 is oriented at the same angle as the port and the first open end 65 faces the opening 31 of the port 30. The second open end 66 of the nozzle 64 is interconnected to the output of the valve 63. Upon detection of an external force on the aircraft by one or more of the sensors 40, the computer 50 opens the necessary ports 30 as in the previous embodiment and activates the valves 63 within the open ports 30 causing them to open and release the gas 60 through the nozzles 64, thereby generating the propulsive thrust necessary to counteract the external force.

The propulsive thrust may also be provided by exhaust emitted by the aircraft engines. Under normal conditions, the exhaust is emitted from the engine into the environment. However, means may be provided to channel this exhaust to the ports when necessary to provide a propulsive force to counteract external forces acting on the aircraft.

Various changes may be made within the spirit and scope of the invention as described above and set forth in the accompanying claims. The number of ports, sensors and gas tanks, as well as the exact location of the ports, sensors and gas tanks may be modified.

What is claimed is:

1. An aircraft stabilizing system for use on aircraft having a fuselage section and wings comprising:

sensing means positioned and disposed at a plurality of predetermined locations on the aircraft for detecting and measuring external forces exerted on said aircraft due to sudden changes in atmospheric pressure at said predetermined locations, thrust means for providing a propulsive force sufficient to counteract said external forces detected by said sensing means so that said external forces and said propulsive force are in equilibrium, thereby maintaining the stability of said aircraft, a plurality of ports positioned at predetermined locations and each structured to house said thrust means therein, said ports being oriented at one of a plurality of select angles relative to said aircraft so that said propulsive force may be selectively directed in a specific direction by actuating said thrust means in one or more of said ports oriented in said specific direction, each of said ports including an opening at the external surface of said aircraft and closure means for closing said opening, thereby concealing said thrust means therein, activation means for selectively activating said thrust means, said activation means being operably interconnected to said thrust means, and computer control means for controlling said thrust means, said closure means and said activation means, said computer control means being operably interconnected to said sensing means, said closure means and said activation means, wherein upon detection of said external forces acting on one or more of said predetermined locations by said sensing means, said computer control means operates said closure means in a select one or more of said ports to an open position and further operates said activation means resulting in activation of said thrust means in said select open ports, thereby generating said propulsive force in said specific direction sufficient to counteract said external forces.

2. An aircraft stabilizing system as recited in claim 1 wherein said sensing means includes a plurality of sensors mounted on said wings and said fuselage of said aircraft at said predetermined locations.

3. An aircraft stabilizing system as recited in claim 1 wherein said thrust means includes a plurality of propulsive rockets positioned and disposed in said ports to provide a propulsive force in an outward direction relative to said aircraft.

4. An aircraft stabilizing system as recited in claim 1 wherein said thrust means includes compressed gas held under substantial pressure, at least one tank mounted in said aircraft for storing said gas therein, a nozzle mounted in said port for releasing said gas, and interconnection means between said tank and said nozzle, whereby release of said gas out of said nozzle results in a propulsive force in an outward direction relative to said aircraft.

* * * * *